(12) United States Patent
Willibald

(10) Patent No.: US 8,231,072 B2
(45) Date of Patent: Jul. 31, 2012

(54) CUTTING ELEMENT

(75) Inventor: Artur Willibald, Uberlingen (DE)

(73) Assignee: AHWI Maschinenbau GmbH, Herdwangen (DE)

( * ) Notice: Subject to any disclaimer, the term of this patent is extended or adjusted under 35 U.S.C. 154(b) by 290 days.

(21) Appl. No.: 12/373,110

(22) PCT Filed: Jun. 22, 2007

(86) PCT No.: PCT/EP2007/005521
§ 371 (c)(1),
(2), (4) Date: Dec. 11, 2009

(87) PCT Pub. No.: WO2008/006457
PCT Pub. Date: Jan. 17, 2008

(65) Prior Publication Data
US 2010/0090047 A1    Apr. 15, 2010

(30) Foreign Application Priority Data
Jul. 11, 2006 (DE) .......................... 10 2006 032 295

(51) Int. Cl.
*B02C 18/18* (2006.01)
(52) U.S. Cl. ........................................... 241/294
(58) Field of Classification Search .................. 241/294, 241/189.1, 194, 195, 235, 242
See application file for complete search history.

(56) References Cited

U.S. PATENT DOCUMENTS

| 1,661,692 | A | 3/1928 | Everist |
| 2,235,919 | A | 3/1941 | Dion |
| 6,176,445 | B1 | 1/2001 | Shinn |
| 6,517,020 | B1 | 2/2003 | Smith |
| 6,699,121 | B2 | 3/2004 | Bognar et al. |
| 6,971,598 | B2 * | 12/2005 | Schillinger et al. ........... 241/194 |
| 7,938,350 | B2 | 5/2011 | Doppstadt et al. |
| 2002/0169011 | A1 | 11/2002 | Wilson |
| 2007/0095431 | A1 | 5/2007 | Cummings |
| 2007/0194161 | A1 | 8/2007 | Doppstadt et al. |

FOREIGN PATENT DOCUMENTS

| DE | 9312059 | 1/1994 |
| DE | 9402062 | 6/1994 |
| DE | 29906398 U1 | 6/1999 |
| DE | 202005009859 U1 | 1/2006 |
| DE | 202005010337 U1 | 2/2006 |
| RU | 2250045 A | 1/2005 |
| SU | 906405 A1 | 2/1982 |
| WO | 2006079207 | 8/2006 |

OTHER PUBLICATIONS

Search Report for DE 10 2006 032 295.9.

* cited by examiner

*Primary Examiner* — Mark Rosenbaum
(74) *Attorney, Agent, or Firm* — Bachman & LaPointe, P.C.

(57) ABSTRACT

A cutting element for comminuting organic substances, organic materials, soils, plant cultures or the like, in particular for mulching, shredding and chopping, which cutting element can be connected fixedly or releasably to a comminuting rotor.

19 Claims, 2 Drawing Sheets

CUTTING ELEMENT

BACKGROUND OF THE INVENTION

The invention relates to a cutting element for comminuting organic substances, organic materials, soils, plant cultures or the like, in particular for mulching, shredding and chopping, which cutting element can be connected fixedly or releasably to a comminuting rotor.

Cutting elements of this type are frequently placed onto cylindrical rotors in order to form cutting element surfaces for the processing of organic materials, for the processing of soils, for mulching, for shredding, etc.

Conventional cutting elements are subject to a high degree of wear, for example when processing soils or organic cultures.

After a relatively long period of use, and depending on the underlying surface, the cutting elements have to be removed from the rotor and replaced by new ones.

Conventional cutting elements are generally subject to too high a degree of wear, are too expensive to produce and occasionally tend to break off from or deform their holders or base parts, which is undesirable.

The present invention is therefore based on the object of providing a cutting element of the generic type mentioned at the beginning, in which the service life during operation is substantially increased, wear is minimized and the production costs are to be minimized while the overall weight is reduced. In addition, an application of force and transmission of force to its retaining part or the rotor is to be optimized. The cutting element is also to be connectable securely and stably to the rotor.

SUMMARY OF THE INVENTION

This object is achieved by a cutting element comprising a fastening means for the fixed or releasable connection to a base part on a comminuting rotor, said cutting element further comprising two limbs and a body part with a cutting edge and rear side(s) facing away from the cutting edge, an axis ($A_{RR}$) of the body part in the region between the two limbs and an axis ($A_{VR}$) of a rear side of a reinforcing projection on the body part on the other side of the cutting edge run at an obtuse angle ($\alpha$, $\beta$) with respect to each other and with respect to a longitudinal axis ($A_L$) of the limbs for bearing in a form-fitting manner on a flank of the base part.

In the present invention, in particular a special design of the geometry and shape of the cutter holder, in particular the body part thereof with adjoining reinforcing profile and limbs which protrude from the body part and are intended for engaging over a base part for holding purposes has proven advantageous.

In order for a transmission of the forces arising at the cutting edge to the base part, which serves to hold the actual cutting element, to be optimized, the body part of the cutter holder forms a reinforcing profile below the cutting edge.

Said reinforcing profile at the same time strengthens the region below the cutting edge, in which a greater part of the cutting forces have to be absorbed, and at the same time forms the holder, and also the support for transmitting force via its rear side to the base part.

For improved lateral stabilization, corresponding profiled portions, V-like grooves, and semicircular, oval grooves, in which end surfaces, which correspond in a precisely matching manner, of the flanks of the base part engage, are provided within the rear side of the reinforcing projection. In this way, there is additional lateral stabilization of the cutting element, and also vibrational behavior in relation to the base part and rotor is significantly reduced.

Furthermore, it is advantageous in the present invention that forces are transmitted to a corresponding flank of the base part not only via the rear side of the reinforcing profile but also via a further rear side of the actual body part, which rear side is located between the two limbs.

Here too, the rear side of the body part, but also the rear side of the reinforcing profile may have corresponding profiled portions as a negative or positive shape in order to ensure additional lateral stabilization of the cutting element, fixed to the base part.

The rear side of the reinforcing profile and the rear side of the body part between the two limbs preferably enclose a very obtuse angle $\beta$ such that it is ensured that the cutting element, placed onto the plate-like base part and fixed by a bolt, screw connection or the like in the region of the limbs, can neither move upward nor downward. Owing to the geometrical shape of the rear sides of the body part and of the reinforcing projection, this ensures additional, mechanical rotational securing against pivoting about a bolt or screw connection. This is intended to likewise lie within the scope of the present invention.

In addition, it has proven advantageous that corresponding, chip-deflecting surfaces can be provided above the cutting edge in the body part. Said surfaces can also be provided in a front side of the reinforcing projection below the cutting edge.

Furthermore, it is advantageous in the present invention that the side surfaces of the reinforcing projection taper at an acute angle $\gamma$ from the front side and cutting edge toward the rear side. Here too, the cutting edge itself is kept free by means of the geometrical shape of the reinforcing projection such that friction is reduced overall during operation and during use, with heating and temperature regulation of the cutting element during use therefore being reduced.

For additional weight reduction and to ensure a high degree of stability, the lateral limbs are provided, on their outer upper side, with corresponding reinforcing profiles which extend in a circular-ring-like manner around the region of the hole and protrude outward in a star-like manner, with one of the reinforcing profiles extending into the region of the body part in order to ensure additional stability. In this case, the limbs themselves can be designed such that they taper conically, from the body part to the hole, in order to provide a weight-reducing cutting element while retaining high absorption forces and a degree of stability.

This provides a cutting element which permits substantially higher absorption of forces and impacts, and ensures better mounting of the cutting element even against laterally acting forces, with low manufacturing costs and optimized removal of chips and removal of organic material.

BRIEF DESCRIPTION OF THE DRAWINGS

Further advantages, features and details of the invention emerge from the description below of preferred exemplary embodiments and with reference to the drawing; in the latter

DETAILED DESCRIPTION

Figure 1:
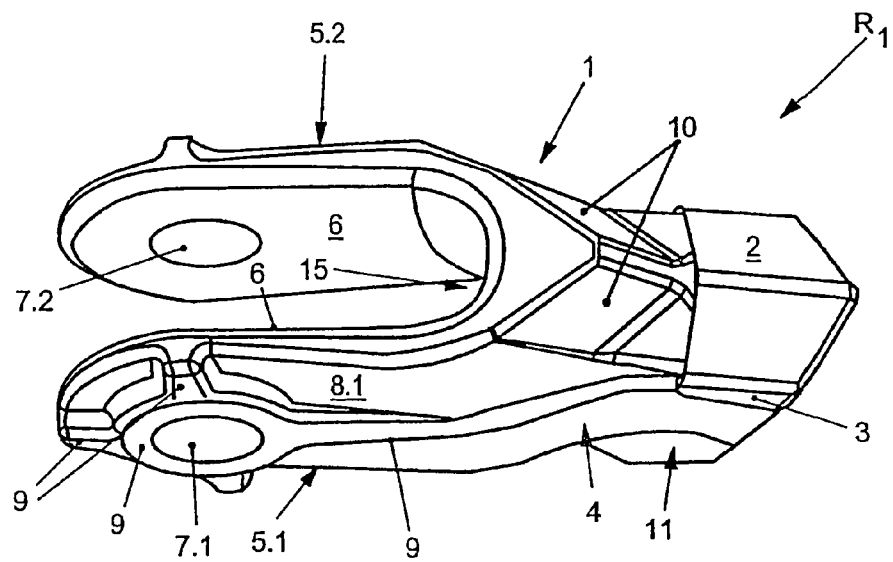
FIG. 1 shows a schematically illustrated, perspective top view of the cutting element.
Figure 2:
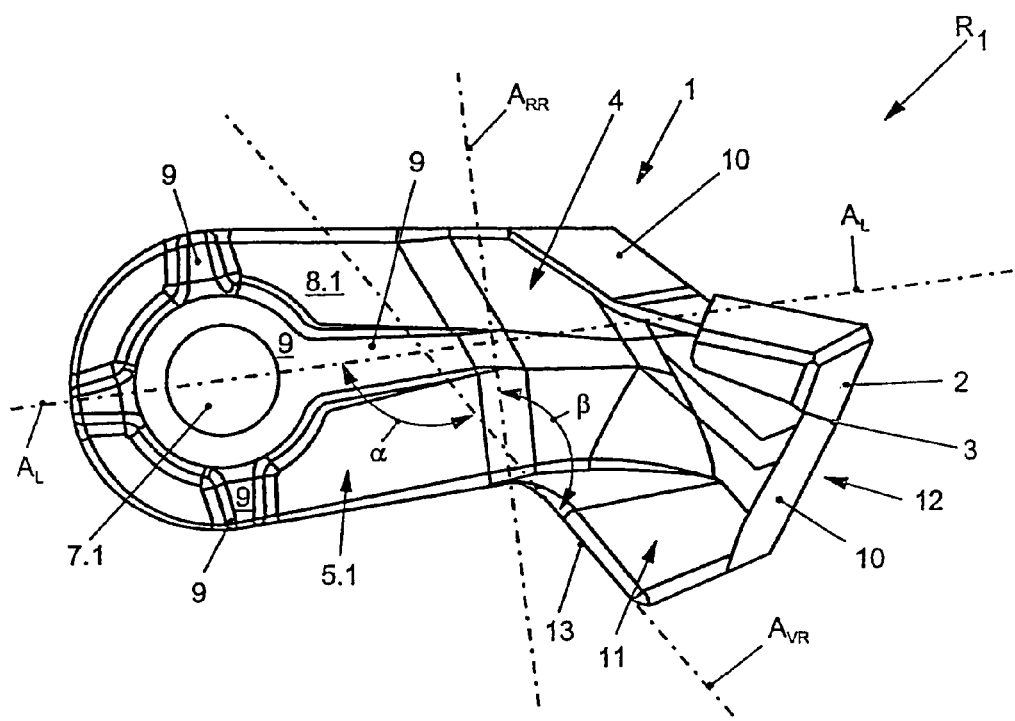
FIG. 2 shows a schematically illustrated side view of the cutting element according to FIG. 1.

According to FIG. 1, a cutting element $R_1$ according to the invention has a cutter holder 1 which, in a front region, accommodates at least one cutting edge 2 on a cutter shoulder 3, which cutting edge is connected fixedly or releasably to the cutter holder 1.

The cutter holder 1 substantially comprises a body part 4 from which two spaced-apart limbs 5.1, 5.2 protrude, with the inner surfaces 6 thereof being formed parallel to each other.

In the end-side regions of the limbs 5.1, 5.2, the latter have mutually aligned holes 7.1, 7.2.

It has proven advantageous in the present invention that the two limbs 5.1, 5.2 taper slightly in their thickness from the body part 4 to the hole 7.1, 7.2.

This enables additional weight and material to be saved, with, in order to compensate for the applied forces, corresponding reinforcing profiles 9 being provided on the outside of an outer surface 8.1, 8.2 of the limbs 5.1, 5.2, said reinforcing profiles reinforcing the region of the hole 7.1, 7.2 in the end-side region of the limbs 5.1, 5.2 preferably in a circular-ring-like manner and/or star-like manner.

In this case, preferably circular-ring-like reinforcements 9 are provided around the hole 7.1, with a reinforcement of the circular-ring-like reinforcement also merging into the cutter holder 1 or the body part 4.

This provides a cutting element $R_1$ which is reduced in weight and at the same time, by means of the correspondingly designed reinforcing profiles 9, provides a limb 5.1, 5.2 which withstands very high loads.

Following the cutting edge 2, preferably above the latter, chip-deflecting surfaces 10, which preferably run at an acute angle, are formed from the body part 4 of the cutter holder.

A reinforcing projection 11 which has a plurality of functions is formed below the cutting edge 2.

On its front side 12, said reinforcing projection is likewise provided with chip-deflecting surfaces 10 which approximately match the shape of the cutting edge 2.

In addition, the reinforcing projection 11, formed from the body part 4, projects at the bottom over the limbs 5.1, 5.2 and forms a reinforcement for absorbing the forces which occur in the region of the cutting edge 2.

Figure 4:
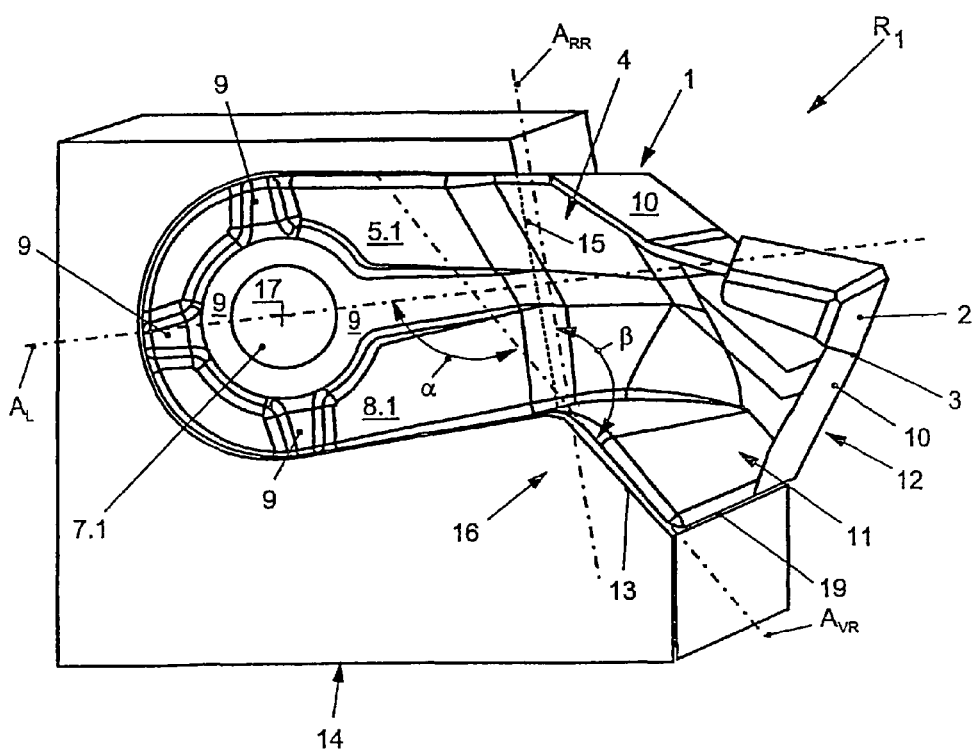
FIG. 4 shows a schematically illustrated, perspective side view of the cutting element according to FIG. 1, placed onto a body part.

It has proven particularly advantageous in the present invention to use a rear side 13 of the reinforcing projection 11 as a bearing surface for a base part 14 which serves to hold the cutting element $R_1$, as illustrated for example in FIG. 4. In this case, the two limbs 5.1, 5.2 engage over the base part 14.

In this manner, a greater part of the cutting forces which occur at the cutting edge 2 during operation is introduced via the reinforcing projection 11 directly into the base part 4 which is connected fixedly, for example, to a rotor or the like.

A further rear side 15 is formed between the two limbs 5.1, 5.2, said rear side also serving for bearing on and transmitting force to the correspondingly shaped base part 14, as indicated in FIG. 4.

The base part 14 is of plate-like design and has corresponding flanks 16, and also a corresponding hole 17 said flanks being aligned when the cutting element $R_1$ is placed on and when the two limbs 5.1, 5.2 engage over them, with the rear side 15 of the body part 4 and the rear side 13 of the reinforcing projection 11 coming into contact, preferably in a form-fitting manner, with the respective flanks 16 of the base part 4.

The flanks 16 of the base part 4 are correspondingly matched to the geometry of the rear sides 13 and 15 of reinforcing profile 11 and body part 4.

It has proven particularly advantageous in the present invention that, for the optimum application of force, the rear side 13 of the reinforcing profile 11 is formed at an obtuse angle of approximately 90° to 160°, preferably 125°, in relation to a longitudinal axis $A_L$ of the cutting element $R_1$.

In this manner, very high forces can be applied and transmitted to the cutting element $R_1$, in particular absorbed via the cutting edge 2, and to the rotor or similar holder via the base part 14.

In this case the rear side 13 bears flush on the flank 16 and the rear side 15 of the body part 4 likewise bears flush on the flank 16 of the base part 14.

So that the cutting element $R_1$ can be securely positioned and fixed in relation to the base part 14 by means of bolts, screws or similar fastening means without said cutting element tilting, and at the same time so that as large a contact surface as possible for the transmission of force is ensured, it has proven advantageous in the present invention to design or shape the rear side 13 of the reinforcing projection 11 likewise at an obtuse angle in relation to the rear side 15 of the body part 4, with the angle of approximately 125° to 175°, preferably 150° being selected.

The longitudinal axis $A_L$ passes approximately centrally, as viewed in the longitudinal direction, through the limbs 5.1, 5.2 as approximately a bisecting line.

Figure 3:
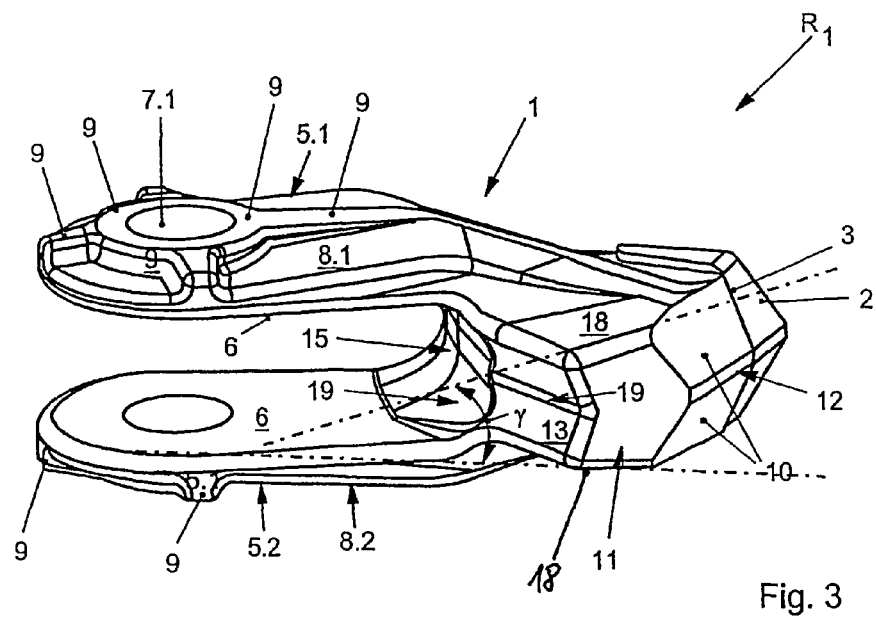
FIG. 3 shows a schematically illustrated, perspective bottom view of the cutting element according to FIG. 1.

Furthermore, it is advantageous in the present invention, as shown in the exemplary embodiment according to FIG. 3, that corresponding side surfaces 18 of the reinforcing projection 8, as illustrated in the bottom view, are of tapered design from the front side 12 to the rear side 13 and preferably peter out in a tapered manner at an acute angle. The side surfaces 18 of the reinforcing projection 11 form an acute angle of approximate 15° to 35°, preferably 25°.

It is advantageous in the present invention that the rear sides 13 and/or 15 of the reinforcing profile 11 or the body part 4 are provided with a profiled portion 19, as indicated in FIG. 3. The profiled portions 19 can be formed negatively in the rear sides 13, 15 in the manner of grooves, as angled grooves, in a V-like manner, oval-like manner or as triangular grooves, or can project positively in a corresponding shape.

The corresponding end sides of the flanks 16 of the base part are then shaped in a manner correspondingly matched to the shape of the profiled portions 19 of the rear sides 13 and 15 such that the rear sides 13 and 15 of the reinforcing profile 11 and body part 4 bear in a form-fitting manner on the base part 14 in a precisely matching manner and a transfer of force is optimized. For this purpose, the lateral stability during the use of the cutting element is considerably increased at the same time.

This is likewise intended to lie within the scope of the present invention.

The invention claimed is:

1. A cutting element comprising a fastening means for the fixed or releasable connection to a base part on a comminuting rotor, said cutting element further comprising two limbs and a body part with a cutting edge and a rear side facing away from the cutting edge, an axis ($A_{RR}$) of the body part in the region between the two limbs and an axis ($A_{VR}$) of a rear side of a reinforcing projection on the body part on the other side of the cutting edge run at an obtuse angle ($\alpha$, $\beta$) with respect to each other and with respect to a longitudinal axis ($A_L$) of the limbs for bearing in a form-fitting manner on a flank of the base part.

2. A cutting element according to claim 1, wherein, for lateral stabilization of the cutting element ($R_1$) or body part in relation to a base part, at least one profiled portion of a rear side of the cutting element ($R_1$) is provided.

3. A cutting element according to claim 1, wherein the limbs have lateral reinforcing profiles, wherein one of the reinforcing profiles is formed around a hole on the limbs.

4. The cutting element as claimed in claim 3, wherein the reinforcing profiles in the lateral limbs are provided in the vicinity of holes for receiving a further fastening means, and the reinforcing profiles are provided annularly around the holes on the outside of a surface of a cutter holder ($R_1$).

5. The cutting element as claimed in claim 3, wherein further reinforcing profiles protrude outward in a star-like manner from the holes.

6. The cutting element as claimed in claim 1, wherein profiled portions of the rear sides of the body part and/or of the rear side of the reinforcing projection are formed as a profile inserted negatively or standing out positively in the manner of a groove, in a cross-sectionally V-like manner, as an oval or in a triangular-like manner, with corresponding profiled portions of end sides of flanks of the base part being designed in a correspondingly matching manner to the cutting element ($R_1$) for the form-fitting holding thereof.

7. The cutting element as claimed in claim 6, wherein the reinforcing projection has chip-deflecting, angled surfaces on its front side, which surfaces are designed such that they run in a conically tapered manner to its rear side.

8. The cutting element as claimed in claim 1, wherein chip-deflecting surfaces are formed above the at least one cutting edge in the body part, in a manner converging centrally to the cutting edge, said surfaces forming an acute angle.

9. The cutting element as claimed in claim 1, wherein the axis ($A_{VR}$) of the rear side of the reinforcing projection encloses an angle ($\alpha$) of approximately 90° to 160° with respect to the longitudinal axis ($A_L$).

10. The cutting element as claimed in claim 1, wherein the axes ($A_{RR}$ and $A_{VR}$) enclose the angle ($\beta$) of approximately 125° to 175°.

11. The cutting element as claimed in claim 1, wherein side surfaces of the reinforcing projection run with respect to each other at an acute angle ($\gamma$).

12. The cutting element as claimed in claim 11, wherein the side surfaces of the reinforcing projection enclose an acute angle ($\gamma$) of approximately 15° to 35°.

13. A cutting element comprising a fastening means for the fixed or releasable connection to a base part on a comminuting rotor, said cutting element further comprising two limbs and a body part with a cutting edge and a reinforcing projection on a rear side facing away from the cutting edge, the reinforcing projection comprising at least one contact surface for attachment and force transmission to the base part, wherein the reinforcing projection has side surfaces that run with respect to each other at an acute angle ($\gamma$).

14. The cutting element as claimed in claim 13, wherein, for lateral stabilization of the cutting element or body part in relation to the base part, at least one profiled portion of a rear side of the cutting element is provided.

15. The cutting element as claimed in claim 13, wherein the limbs have lateral reinforcing profiles, wherein one of the reinforcing profiles is formed around a hole on the body part.

16. The cutting element as claimed in claim 13, wherein the reinforcing profiles in the lateral limbs are provided in the vicinity of holes for receiving the fastening means, and the reinforcing profiles are provided annularly around the holes on the outside of a surface of a cutter hole.

17. The cutting element as claimed in claim 16, wherein further reinforcing profiles protrude outwardly in a star-like manner from the holes.

18. The cutting element as claimed in claim 13, wherein profiled portions of the rear sides of the body part and/or of the rear side of the reinforcing projection are formed as a profile inserted negatively or standing out positively in the manner of a groove, in a cross-sectionally V-like manner, as an oval or in a triangular-like manner, with corresponding profiled portions of end sides of flanks of the base part being designed in a correspondingly matching manner to the cutting element ($R_1$) for the form-fitting holding thereof.

19. The cutting element as claimed in claim 18, wherein the reinforcing projection has chip-deflecting, angled surfaces on its front side, which surfaces are designed such that they run in a conically tapered manner to its rear side.

* * * * *